United States Patent [19]
Maier

[11] 4,147,461
[45] Apr. 3, 1979

[54] MULTIPLE SPINDLE DRILLING UNIT

[76] Inventor: Dieter Maier, Schulstrasse 4, 7911 Burlafingen, Fed. Rep. of Germany

[21] Appl. No.: 770,934

[22] Filed: Feb. 22, 1977

[30] Foreign Application Priority Data

Feb. 27, 1976 [DE] Fed. Rep. of Germany ....... 2608141

[51] Int. Cl.² .............................................. B23B 39/18
[52] U.S. Cl. ......................................... 408/46; 408/48
[58] Field of Search ................................... 408/46, 48

[56] References Cited

U.S. PATENT DOCUMENTS

| | | | |
|---|---|---|---|
| 2,549,490 | 4/1951 | Kuhl | 408/96 X |
| 3,240,084 | 3/1966 | Palmer | 408/48 X |
| 3,682,560 | 8/1972 | Suizu | 408/46 |
| 3,822,958 | 7/1974 | Lewis | 408/46 |

FOREIGN PATENT DOCUMENTS 1185956  2/1959  France ........................ 408/48

*Primary Examiner*—Al Lawrence Smith
*Assistant Examiner*—K. J. Ramsey
*Attorney, Agent, or Firm*—Michael J. Striker

[57] ABSTRACT

A multiple spindle machine comprising a drive unit having a plurality of drive shafts rotatable from a motor over speed change gears and a drilling head unit carrying a plurality of tool spindles connected by universal joint shafts to coupling elements which can be brought into and out of coupling engagement with said drive shafts by moving said units relative to each other.

14 Claims, 6 Drawing Figures

MULTIPLE SPINDLE DRILLING UNIT

BACKGROUND OF THE INVENTION

Different arrangements are known to set up different drilling patterns in, for instance, universal-joint shaft drilling machines. (For instance, the DT-OS Nos. 2,038,999; 2,040,815 and 2,047,991 or the Swiss Pat. No. 396,578). In these known arrangements the individual boring spindles are conveyed on carriers and by means of the same set up to the respective new boring coordinates. These carriers however can usually not absorb high boring forces, so that the difficulties during a tool change at the setting up of a new boring pattern are not obviated by these known arrangements; and it is also not possible, to make ready a tool guide for the new boring pattern. In addition the expenditure for the positioning device by means of which a new boring pattern can be set up, is, in the known arrangements, exceedingly high.

An arrangement for multispindle drilling machines with universal-joint shafts is further known, in which an exchangeable setting up frame, in which the drilling spindles and the universal-joints shafts are positioned, may be taken out from the so-called headskirt. Due to this construction it is possible to set up the drilling pattern in this multispindle drilling machine outside the machine; however, the assembly and disassembly of the setting up frame has to be performed manually, which again is very time consuming. Furthermore, due to the large feed-in stroke for the setting up frame in this multispindle drilling machine, the guide ways have to be considerably longer than in known multispindle drilling machines, whereby the expenditure for the material and the construction of the machine is increased. The known multispindle drilling machine is also not suitable for its application in an automatic manufacturing system since the mounting and demounting of the setting up frame is not possible without manual operation. (DT-OS No. 1,977,854).

SUMMARY OF THE INVENTION

The invention therefore shall provide for a multispindle machine in which, without manually interfering in the working cycle of an automatic manufacturing system, the change to a different drilling pattern may be automatically performed so that it may be included during a multispindle machining of workpieces into an automated working cycle.

With these and other objects in view, which will become apparent as the description proceeds, the multiple spindle machine according to the present invention mainly comprises a drive unit including a housing having a coupling face, a plurality of drive shafts mounted in said housing uniformly spaced from each other in a predetermined pattern and projecting outwardly from the coupling face, speed change gears in said housing and connected to the drive shafts, and drive means for driving the speed change gears; at least one drilling head unit having a counter coupling face provided with a plurality of bores equal in number to said plurality of drive shafts and arranged uniformly spaced from each other in the same pattern as said drive shafts, a plurality of coupling elements turnably mounted in at least some of these bores in the counter coupling face, tool spindle carrier means mounted in the drilling head unit on a face opposite the counter coupling face, a plurality of tool spindles, equal in number to the plurality of coupling elements which are inserted into the bores and rotatably mounted in the tool spindle carrier means projecting outwardly therefrom, and a plurality of universal joint shafts respectively coupling said coupling elements to the tool spindles, the drilling head unit being adapted to be provided with a desired number of coupling elements and drill spindles connected thereto in any desired drilling pattern while being separated from the drive unit. The multiple spindle machine includes further first means for moving the thus-set-up drilling head unit in a direction normal to the drive shafts to a position in which the counter coupling face of the drilling head unit is parallel and spaced from the coupling face with the drive shafts respectively axially aligned with the bores in the counter coupling face, and second means for moving one of the units in the axial direction of the drive shafts toward the other unit so as to move the drive shafts into coupling engagement with corresponding coupling elements.

Preferably the plurality of drive shafts of the distribution gearing and correspondingly the plurality of coupling elements in the drilling head are arranged in form of a matrix in parallel lines and columns or also at uniformly distributed distances on concentric circles. Due to the plurality of very closely arranged drive shafts, respectively coupling elements, which are uniformly distributed over the coupling- and countercoupling area, it is possible, at the predetermined maximum deflection angle of the joint shafts, to build the drilling head so short as for instance in a comparable conventional fixed multispindle head with gears. Due to its considerably smaller dimensions and due to its smaller weight the drilling head with universal-joint shafts according to the present invention is especially suitable for an automatic exchange.

The drilling head with universal-joint shafts according to the invention can therefore, after it is set up an external setting up station for a desired new drilling pattern, be transported for instance by means of a conventional transporting device, for instance on directly in front of the drive shafts of the distribution gearing extending transport tracks, whereafter the positioning is carried out in a usual manner, for instance by means of correspondingly constructed index pins and bores correlated therewith or by moving the drilling head against corresponding locating faces of the machine. Subsequently thereto the coupling of the coupling elements of the drilling head and the drive shafts of the gearing is carried out, whereby corresponding to the moment which has to be transmitted different ways of coupling are possible.

According to an advantageous construction of the invention, the coupling of the plurality of the drive shafts and the plurality of coupling elements can thereby be carried out by a friction coupling, in which the coupling surfaces are for instance provided with special friction linings, which may have the form of a planar surface (of a circular surface), a cylindrical surface of a conical surface. The coupling force itself may be produced by means of hydraulic, pneumatic or mechanical elements directly, or over corresponding force accumulator elements.

According to a further feature of the invention the coupling of the plurality of drive shafts and the plurality of coupling elements can be performed by a form fitting or positive coupling. Such a positive coupling may be carried out by key-keyway connections, by polygonal shafts with corresponding counter parts, or by differently formed radial or conical serrations. In order that the positive coupling of the plurality of drive shafts with the coupling parts can be carried out automatically, the drive shafts or the coupling parts may be resiliently biased in axial direction according to a further development of the invention, whereby, in order to facilitate the coupling process and to carry it out in a perfect manner, an additional braking device is preferably cooordinated with the plurality of coupling elements. In addition the plurality of drive shafts and the coupling elements and the corresponding counterelements may also be constructed as spline shafts provided in axial direction with chamfers.

According to a further feature of the invention all drive shafts may, for a positive coupling, be brought by means of a spindle locating device, known per se, in the distribution gearing to an exactly determined repeatable angular position, that is, they will always be brought into the same angular position and arrested in this position. Before decoupling of the drilling head, all coupling elements of the drilling head are arrested and held in this position, for instance, by a corresponding positive or friction arresting means, for instance by a positive arresting device or by a frictional braking device, and then maintained in this position during changeover of the drilling head. At a renewed coupling of the drilling head onto the multispindle drilling machine, the cooperating coupling elements, that is the drive shafts and the coupling parts, may thus be moved without difficulty into each other, whereby at the end of the coupling process the arresting or braking devices are released.

At the end of the coupling process, which can be carried out in any of the above-mentioned ways, the drilling head unit is clamped onto the driven unit by means of a conventional clamping device. Subsequent thereto the actual working process can be carried out.

A plurality of drilling heads according to the present invention may be provided, each be externally set up to a specific drilling pattern; so that then such drilling heads may be automatically and selectively moved into engagement with the driven unit of the multispindle machine. A change of the drilling pattern can therefore be carried out at the multispindle machine according to the invention without requiring any manual intervention by the operating personnel.

According to a further advantageous feature of the invention it is possible to drive the drive shafts in the distribution gearing with different revolutions per minute, and the different revolutions per minute may be arranged in groups in such a manner that, uniformly distributed over the coupling area, drive shafts with different revolutions per minute can alternate with each other.

According to a further development of the invention, speed change gears may be coordinated with each drive shaft in such a manner that a predetermined number of revolutions may be connected mechanically, electromagnetically, hydraulically or pneumatically to each of the drive shafts; whereby different numbers of revolution steps and also an idling step is possible. The switching may be carried out mechanically by means of bolts which for instance are provided adjacent the respective coupling place in the drilling head of the multiple spindle machine. The respective individual speed change gears will then be moved during the coupling by means of a control rod into the required position. The mechanical, electromagnetic, hydraulic or pneumatic switching of a predetermined number of revolutions can for instance be controlled by means of code element provided on the drilling head. The positioning of the individual speed change gears can likewise be produced directly by numerical control which also produces the other orders for the machine.

According to a further developments of the invention, the single spindle headstock of a conventional numerically controlled multispindle machine may be replaced by the speed change gears with a plurality of drive shafts and by the required device for changing of a drilling head. Finally, the distribution and speed change gears with the plurality of drive shafts and the device for changing the headstock may also be provided in addition to the conventional spindles in a spndle stock of a preferably numerically controlled machine.

In the following the invention is further discussed on the basis of a preferred embodiment with reference to the attached drawing.

BRIEF DESCRIPTION OF THE DRAWING

FIG. 1b is a front view of the embodiment illustrated in FIG. 1a;

DESCRIPTION OF THE PREFERRED EMBODIMENTS

Figure 1A:
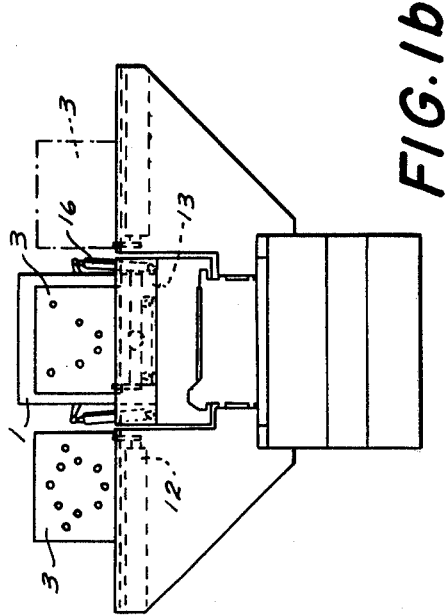
FIG. 1a is a schematic side view of an embodiment of a multispindle drilling machine with automatically exchangeable joint-shaft drilling heads according to the invention.

The same or corresponding parts in these Figures are designated with the same reference numerals.

Figure 1B:
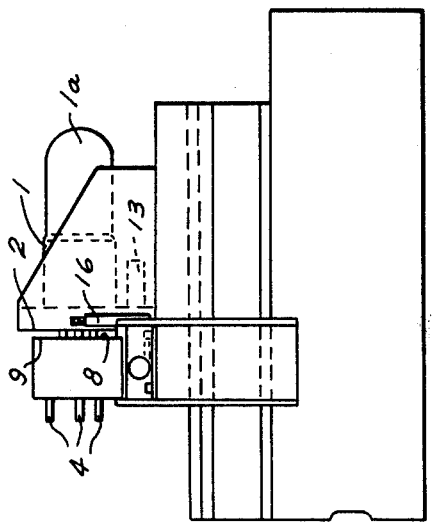
Figure 1C:
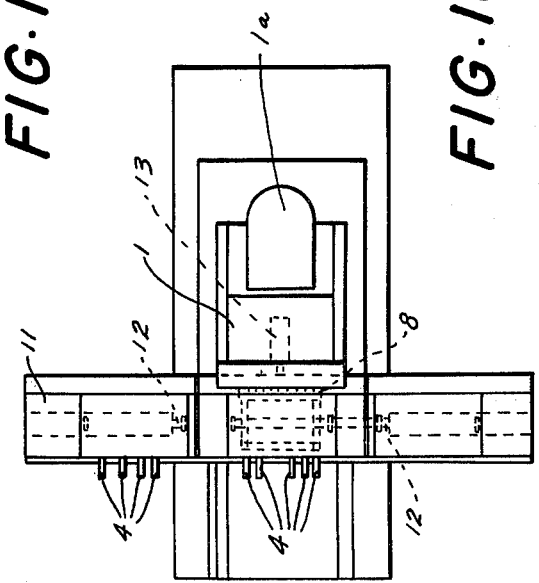
FIG. 1c is a top view of the embodiment illustrated in FIGS. 1a and 1b.
Figure 2A:
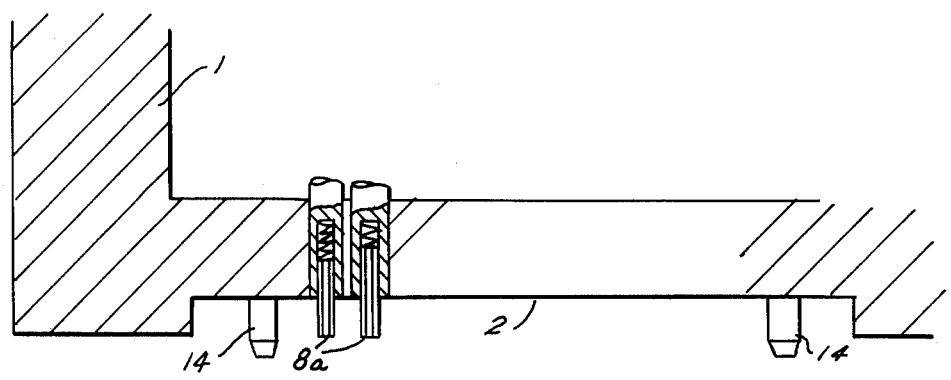
FIG. 2a is a schematic cross section at an enlarged scale through the joint-shaft drilling head and through parts of the drive side of the distribution gearing.
Figure 2A:
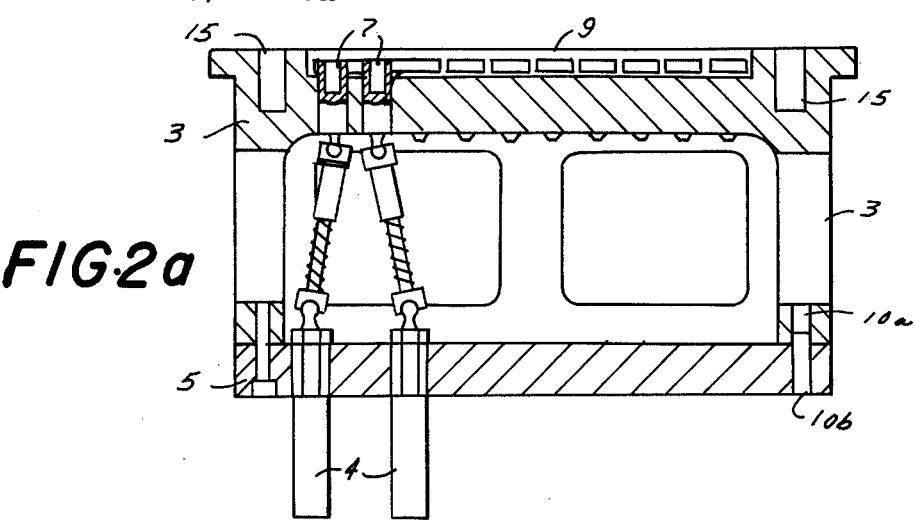

In FIGS. 1a–1c a multispindle drilling machine is illustrated in side-, front- and top-view, in which an automatically changeable joint-shaft drilling head 3 as well as distribution and speed change gears 1 according to the invention are provided. In the following description of the FIGS. 1a–1c only the parts and devices will be further discussed which in view of the invention are of importance, that is, those devices and parts, which are also provided in all known multispindle drilling machines, will not be further discussed, even though, they are schematically shown in the FIGS. 1a–1c. The distribution and speed change gears 1, the drive side of which will be further discussed on the basis of FIG. 2a, are driven by means of a motor 1a connected thereto. FIGS. 1a–1c schematically illustrate further a coupling arrangement 13, by means of which the respective drilling head 3 is coupled to the distribution and speed change gears 1 in that the drilling head 3 is moved against the distribution and speed change gears 1 or the latter against the drilling head. An exact correlation of the position of the drilling head 3 and the distribution and speed change gears 1 may for instance be carried out by means of a heavy index bolt 14 and a correspondingly fitting index bushing 15 (see FIG. 2a). The position correlation may however be also carried out by definite movement of the drilling head against corresponding reference surfaces of the multispindle machine. After coupling of the drilling head 3 with the distribution and speed change gears 1, the drilling head will be held by means of a preferably hydraulically operable clamping device 16. In the FIGS. 1a-1c the drilling head 3 and the distribution and speed change gears 1 are not yet coupled with each other. In those figures the drive shafts 8 on the drive side of the distribution and speed change gears 1 are therefore still visible, which during the coupling process are introduced in corresponding coupling elements 7, illustrated in FIG. 2a. On the output side of the drilling head 3 different machining tools, for instance drill spindles 4 are visible.

Especially in FIGS. 1b and 1c a plurality of drilling heads 3 are illustrated which are transported on a transport track 11 by means of a transporting device 12 from a magazine, not shown in the drawing, to the multispindle machine. Of the for instance three drilling heads illustrated in FIG. 1b, the middle drilling head is coupled to and clamped on the distribution and speed change gears 1. With the drilling head illustrated in FIG. 1b on the right side in dashdotted lines, the desired machine operation has already been performed and this drilling head will, by means of the transporting device coordinated therewith, be moved again into the magazine. The drilling head shown at the left side of FIG. 1b constitutes a further drilling head held ready, which, as soon as the maching operation has been carried out with the middle drilling head, will be exchanged against the latter.

Since the setting up of the individual drilling heads is carried out at an external setting up station, the automated operating sequence of the arrangement will not be impaired. After setting up the drilling head 3 with tools, for instance drill spindles 4, the completely adjusted drilling head will be stored in the magazine of the multispindle drilling machine and receives a corresponding correlating number for instance by mounting thereon a code bolt. If now, during the operating cycle a drilling head 3 characterized in the aforementioned manner will be required, then the drilling head 3 is moved automatically on the transport track 11 from the magazine to the distribution and speed change gears 1 for instance by a signal of the machine control imparted to the transporting device 12. As already described above, the drilling head is then moved by means of the coupling arrangement 13 against the distribution and feed change gears 1, or the gear unit 1 against the drilling head 3. After an exact correlation of the position of the drilling head 3 and the gear unit 1 and a connection of the corresponding parts of the drilling head 3 and the gear unit 1, as will be further described in connection with FIG. 2a, the drilling head 3 is clamped at the end of the coupling operation by means of the clamping device 16 on the gear unit 1.

Subsequently thereto the actual machining operation is carried out. After the working stroke is finished, the exchange operation of the drilling head which in this machining cycle is not any longer required, is carried out upon a signal of the control in reversed direction. That is, the clamping device 16 is again released and the coupling device 13 separates the drilling head 3 and the gear unit 1 and releases thereby the coupling connections. A transport device 12 engages then the drilling head 3 and moves it, corresponding to the dash-dotted illustration of the right drilling head in FIG. 1b, back into the magazine. Simultaneous therewith or subsequent thereto a new exchange process may be carried out, for instance the drilling head 3, shown in FIG. 12 at the left side is now moved into working position.

A part of the drive side of the distribution and speed change gears 1 is illustrated in section in FIG. 2a. In this drive side part of the housing of the distribution gearing 1 a plurality of drive shafts 8 are mounted, whereby in FIG. 2a only two drive shafts 8 are illustrated in form of spring-biased polygon shafts. The position of the remaining drive shafts is only indicated by the dash-dotted center lines thereof. Index bolts 14 project further from the coupling surface 2 of the gearing 1, of which only two are illustrated.

FIG. 2a illustrates, likewise in section, opposite the coupling face 2 of the gear unit 1, a drilling head 3 having a coupling counterface 9 in which a plurality of coupling parts 7 are mounted, corresponding to the number of the drive shafts 8 in the gearing unit 1. The coupling counterface is further provided at the locations, corresponding to the locations of the index bolts 14 of the gearing unit 1, with index bushings or bores 15. A spindle bearing plate 5 is mounted on the other side of the housing of the drilling head, and fixed in position on the drilling head by means of bolts 10b introduced into the index bores 10a and fixedly connected to the housing by a screw connection. A plurality of drill spindles 4 are mounted in the spindle bearing plate, the number and arrangement of which correspond to the desired drilling pattern. If instead of the spindle bearing plate 5 a spindle carrier is used, the same will be fixed on non-illustrated circumferentially extending T-grooves of the drilling head 3, as for instance are provided on the head-skirt of a conventional joint-shaft drilling machine. Universal-joint shafts 6 are provided between the spherically-shaped ends of the coupling elements 7 are the drill spindles 4 in the interior of the drilling head 3. The universal-joint shafts 6 are of known construction so that the arrangement and operation thereof need not be further discussed in this connection.

Figure 2B:
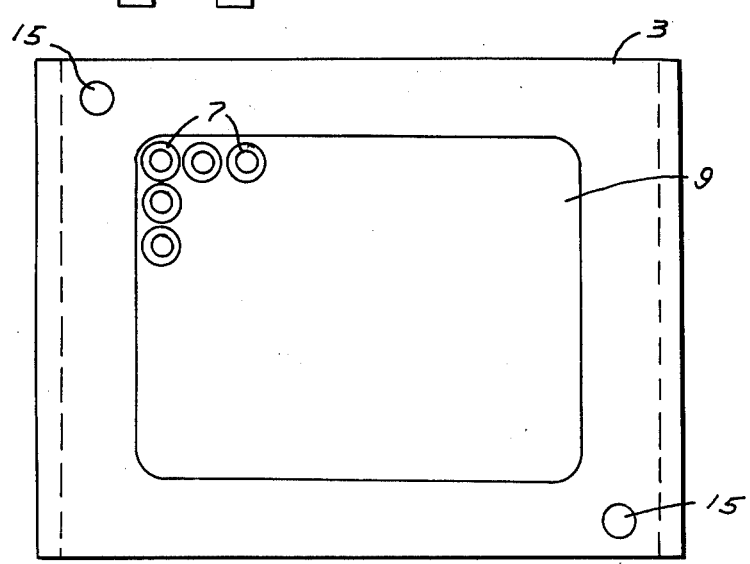
FIG. 2b is a top view of the schematically illustrated drive side of the joint-shaft drilling head according to the invention.

FIG. 2b illustrates a front view of the counter coupling face 9 of the drilling head 3. The coupling parts 7, which are provided with polygonal recesses, corresponding to the polygonal shaft illustrated in FIG. 2a, are uniformly distributed over the coupling counter face 9 in such a manner, that they are respectively located at the crossing points of a matrix like arranged lines and columns. FIG. 2b illustrates for the reason of clarity only five coupling parts. The remaining coupling parts are arranged concentrically to the crossing point of the dash-dotted lines indicated in the coupling counterface 9 in FIG. 2b. Whereas the drive shafts 8 of the gear unit 1 are respectively arranged at all the crossing point of the lines and columns which are normal to each other, if they are in the form of a matrix uniformly distributed over the coupling face 2, in the counter coupling-face 9 only such coupling parts 7 need to be provided, which are necessary for the drilling pattern to be created. That means, the number of coupling parts 7 in the coupling counterface 9 of the drilling head 3 may eventually be considerably smaller than the number of the drive shafts 8 which are uniformly distributed over the coupling face 2 of the drive unit 1. In FIG. 2b two index bushings 15 may also be seen, which are arranged diametrically with respect to each other.

Figure 3:
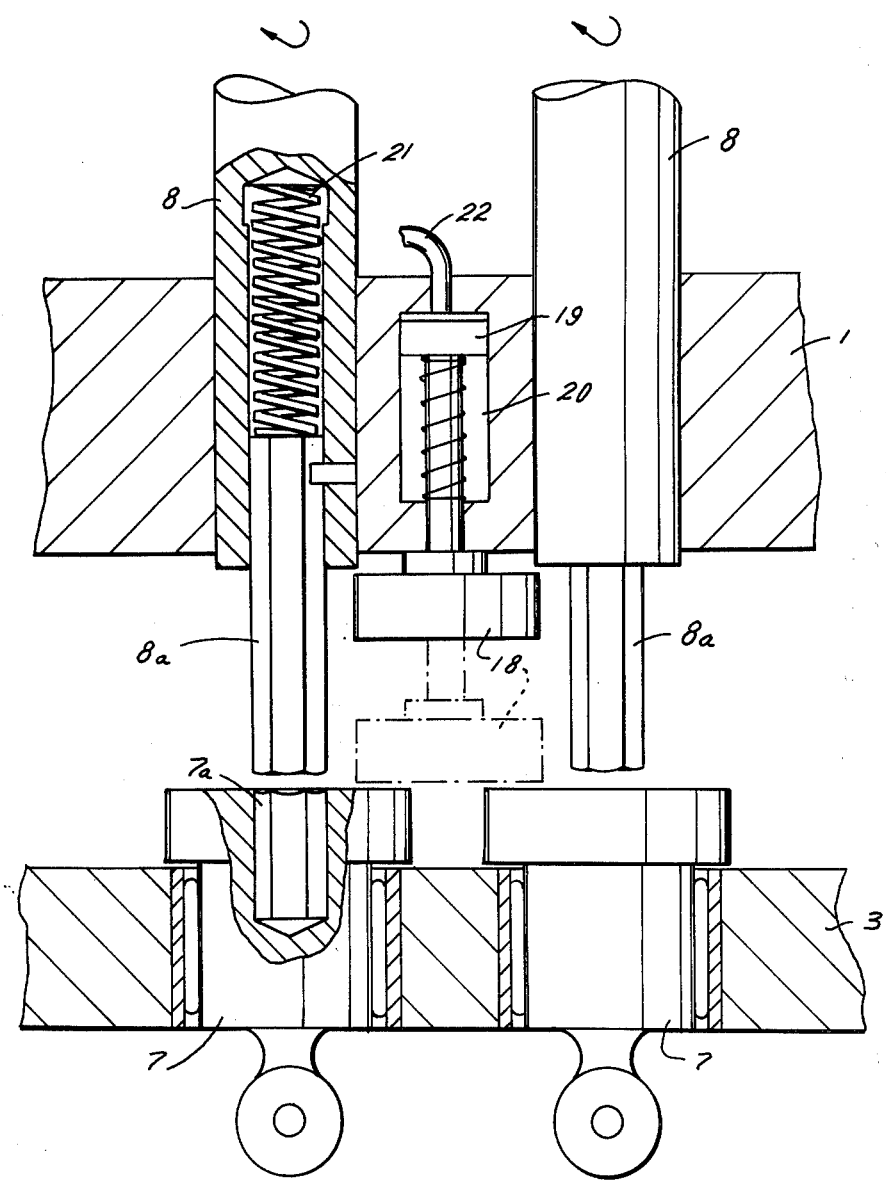
FIG. 3 is a further enlarged partly sectional view of two spring mounted drive shafts of the distribution gearing and coupling elements of the joint-shaft drilling head coordinated therewith with a braking device.

If, as above described, the drive unit 1 should be coupled to the drilling head 3, the drilling head is brought to such a position, so that in the illustrated embodiment the index bolts 14 are exactly opposite the index bushing 15, so that, when the drilling head 3 is moved toward the drive unit or the latter against the former, the index bolts 14 move exactly into the index bushing 15. During the movement of the drilling head and the drive unit 1 against each other, the drive shafts 8 are simultaneously moved into the corresponding coupling parts 7. Thereby exist, as already mentioned above, different possibilities for the coupling process. One of these possibilities of the coupling of a spring-biased polygon shaft 8a, which can be moved in a correspondingly formed polygonal bore, will now be described with the aid of FIG. 3. In this construction the polygonal shafts 8a are resiliently biased by means of springs 21 in the actual drive shafts 8. During coupling of the drilling head 3 the resiliently mounted polygonal shafts 8a may be partly retracted they have moved into the polygonal bore 7a of the coupling parts 7 and provided a positive movement transmission.

In order to avoid that during the inserting process the coupling parts 7 rotate together with the drill spindles 4, connected thereto by the universal-joint shafts 6, and therewith complicate the inserting process, a resiliently mounted braking device 18 is respectively provided between the polygon shafts 8a on the drive unit 1. The braking device includes a rod on the side of the braking device 18 which faces the drive unit 1, which rod is connected with a piston 19 guided in a cylinder 20. During the coupling process the piston 19 and therewith the braking device is moved downwardly by means of compressed air passing through the conduit 20 and brought to the position indicated in dash-dotted lines in FIG. 3, so that the coupling parts 7 which are coordinated with the respective braking device, are braked. Due to this braking of the coupling parts 7, the inserting process is usually finished after turning of the drive shaft 8 through 30 degrees. By the braking device 18 it is therewith assured, that already during the movement of the drive unit and the drilling head 3, toward each other, all polygonal shafts 8a are moved into the corresponding poygonal bores 7a of the coupling parts 7 and that the drive moment is substantially simultaneously transmitted to all spindles provided in the drilling head 3.

If the drilling head is to be changed over in an external, not illustrated, assembly station to another drilling pattern, the necessary spindles are mounted in a spindle bearing plate 5 which is bored in a boring apparatus, and the spindle bearing plate 5 is fixed to the drilling head 3 by means of the index bores 10a and the index pins 10b and connected by screws to the drilling head. For instance drill spindles 4 are then pushed on the universal-joint shafts 6 and connected with the coupling parts 7 next thereto. Subsequently thereto the drill guide plates with their guide columns are connected by connecting means provided on the drilling head 5 or the spindle bearing plate. As already mentioned, spindle carriers may also be instead of the spindle bearing plate which are then fixed onto the circumferential T-grooves of the drilling head.

The mechanical development of the multispindle machine, the main components of which are the above described automatically exchangeable multispindle heads 3, the universal-joint shafts 6, the devices 13 and 16, for changing the drilling head 3 with the corresponding drives and the gear unit 1, can for instance be carried out in the following manner. The control of the whole cycle of the exchange processes, the working movement and the movement of the table, on which the workpieces are clamped, may be carried out by hand, by means of a follow-up control or by means of a numerically controlled program sequence, which for instance may be stored in a digital data carrier. An automatic numerically controlled program sequence may be started either by a manual command by pressing a button, by a signal of a machine control, by a central calculator of the machine system (that is a flexible manufacturing system), or also through mechanically initiated commands, for instance by a correspondingly coded workpiece or by a correspondingly coded multispindle head. Further auxiliary functions as for instance the start of coolant pumps or the start of rotary tables etc. may be initiated by the control.

In order to permit during machining with different tool diameters an at least substantially correct number of revolutions of the individual tools, it is possible, as already mentioned above, to assign to the drive shafts in the drive unit different numbers of revolutions in such a manner that drive shafts with different numbers of revolutions will alternate uniformly distributed over the coupling face. On the other hand, change gears may be coordinated with each drive shaft so that the same may be mechanically, electromagnetically, hydraulically or pneumatically be individually regulated to a desired number of revolutions.

I claim:

1. A multiple spindle machine comprising a drive unit including a housing having a coupling face, a plurality of drive shafts mounted in said housing uniformly spaced from each other in a predetermined pattern and projecting outwardly from said coupling face, speed change gears in said housing connected to said drive shafts, and drive means for driving said speed change gears; at least one drilling head unit having a counter coupling face provided with a plurality of bores equal in number to said plurality of drive shafts and arranged uniformly spaced from each other in the same pattern as said drive shaft, a plurality of coupling elements turnably mounted in at least some of said bores in said counter coupling face, tool spindle carrier means mounted on said drilling head unit on a face opposite said counter face, a plurality of tool spindles, equal in number to said plurality of coupling elements which are inserted into said bores, rotatably mounted in said tool spindle carrier means and projecting outwardly therefrom, and a plurality of universal joint shafts respectively coupling said coupling elements to said tool spindles, said drilling head unit adapted to be provided with the desired number of coupling elements and drilling spindles connected thereto in any desired drilling pattern while being separated from said drive unit; first means for moving the thus set-up drilling head unit in a direction normal to the drive shafts to a position in which said counter coupling face of the drilling head unit is parallel and spaced from said coupling face with said drive shafts respectively aligned with said bores in said counter coupling face; and second means for moving one of said units in the axial direction of the drive shafts towards the other unit so as to move drive shafts into coupling engagement with corresponding coupling elements.

2. A multiple spindle machine as defined in claim 1, and including clamping means for clamping said units to each other after drive shafts and coupling elements are coupled to each other.

3. A multiple spindle machine as defined in claim 1, wherein a plurality of drill head units are provided, each set up for a different drilling pattern, and wherein said first and second moving means are constructed to move one drilling head unit after the latter has performed its drilling operation away from said drive unit, and another drilling head unit, set up with a different drilling pattern, into operative position with said drive unit.

4. A multiple spindle machine as defined in claim 1, wherein said plurality of drive shafts of said drive unit and correspondingly also the plurality of bores in said counter coupling face of said drilling head unit are arranged at the intersection points of a first plurality of parallel lines with a second plurality of parallel lines normal to said first plurality.

5. A multiple spindle machine as defined in claim 1, wherein said plurality of drive shafts of the drive unit and correspondingly also the bores in the counter face of said drilling head unit are arranged uniformly spaced from each other in concentric circles.

6. A multiple spindle machine as defined in claim 1, wherein said drive shafts and said coupling elements are provided with friction faces for frictionally coupling said drive shafts and coupling elements with each other.

7. A multiple spindle machine is defined in claim 1, and including releasable braking means for braking said plurality of coupling elements during coupling the same with said drive shafts.

8. A multiple spindle machine as defined in claim 1, wherein said drive shafts have each an end portion of a cross-section engageable in a bore of corresponding cross-section in the cooperating coupling elements for positive coupling the drive shafts with the corresponding coupling element.

9. A multiple spindle machine as defined in claim 8, and including means for outwardly biasing said drive shafts.

10. A multiple spindle machine as defined in claim 8, wherein said drive shafts are chamfered in axial direction and said bores in said coupling elements are provided with corresponding chamfers.

11. A multiple spindle machine as defined in claim 8, and including means for moving said drive shafts before decoupling to a predetermined angular position and for releasably arresting the same in said angular position, and further means for releasably arresting said coupling elements in a corresponding angular position to facilitate a recoupling of drive shafts with corresponding coupling elements.

12. A multiple spindle machine as defined in claim 1, wherein said drive shafts are respectively rotated at different numbers of revolutions per time unit by said speed change gears.

13. A multiple spindle machine as defined in claim 12, wherein different numbers of revolutions are assigned to groups of said drive shafts in such a manner that, uniformly distributed over said coupling face, drive shafts with different numbers of revolutions alternate with each other.

14. A multiple spindle machine as defined in claim 12, and including means for shifting said speed change gears for individually rotating each of the drive shafts with a predetermined number of revolutions.

* * * * *